US012384895B2

(12) United States Patent
Kick et al.

(10) Patent No.: US 12,384,895 B2
(45) Date of Patent: Aug. 12, 2025

(54) FILM, IN PARTICULAR COVER FILM FOR FOOD CONTAINERS AND/OR PHARMACEUTICAL PRODUCTS

(71) Applicant: Constantia Pirk GmbH & Co. KG, Pirk (DE)

(72) Inventors: Markus Kick, Weiden/Opf (DE); Thomas Kesmarszky, Weiherhammer (DE)

(73) Assignee: CONSTANTIA PIRK GMBH & CO. KG, Pirk (DE)

( * ) Notice: Subject to any disclaimer, the term of this patent is extended or adjusted under 35 U.S.C. 154(b) by 692 days.

(21) Appl. No.: 17/766,481

(22) PCT Filed: Oct. 2, 2020

(86) PCT No.: PCT/EP2020/077759
§ 371 (c)(1),
(2) Date: Apr. 4, 2022

(87) PCT Pub. No.: WO2021/064231
PCT Pub. Date: Apr. 8, 2021

(65) Prior Publication Data
US 2023/0242724 A1    Aug. 3, 2023

(30) Foreign Application Priority Data

Oct. 4, 2019 (DE) .................. 10 2019 126 762.5

(51) Int. Cl.
| | |
|---|---|
| C08J 7/04 | (2020.01) |
| B32B 27/36 | (2006.01) |
| B65D 65/42 | (2006.01) |
| C09D 7/61 | (2018.01) |
| C09D 133/06 | (2006.01) |
| C09D 133/10 | (2006.01) |
| C09D 167/02 | (2006.01) |
| C09J 133/10 | (2006.01) |

(52) U.S. Cl.
CPC .......... *C08J 7/0427* (2020.01); *B32B 27/36* (2013.01); *B65D 65/42* (2013.01); *C09D 7/61* (2018.01); *C09D 133/062* (2013.01); *C09D 133/10* (2013.01); *C09D 167/02* (2013.01); *C08J 2333/10* (2013.01); *C08J 2367/02* (2013.01); *C08J 2433/10* (2013.01); *C08J 2467/00* (2013.01)

(58) Field of Classification Search
CPC .... C08L 2205/025; C08L 67/02; C08L 33/10; C09D 167/02; C09D 133/10; C09D 133/062; C09J 167/02; C09J 133/10
See application file for complete search history.

(56) References Cited

U.S. PATENT DOCUMENTS

| | | | | |
|---|---|---|---|---|
| 5,585,050 A | * | 12/1996 | Jorda ..................... | A01N 25/28 |
| | | | | 264/4.1 |
| 6,238,788 B1 | | 5/2001 | Bradt .............................. | 428/35 |
| 6,458,439 B1 | * | 10/2002 | Jung ..................... | B05D 1/265 |
| | | | | 428/35.8 |
| 8,025,758 B2 | | 9/2011 | Loehden et al. ......... | C04B 37/00 |
| 2008/0057205 A1 | * | 3/2008 | Lohden ................ | C09D 123/02 |
| | | | | 525/228 |
| 2008/0292893 A1 | | 11/2008 | Loehden et al. ............. | 428/458 |
| 2011/0163101 A1 | | 7/2011 | Deng ..................... | B65D 53/00 |
| 2011/0171481 A1 | | 7/2011 | Kainz et al. .................. | 428/480 |
| 2011/0196087 A1 | * | 8/2011 | Brenner ................ | C09J 133/06 |
| | | | | 525/78 |
| 2011/0300322 A1 | | 12/2011 | Kohlstruk et al. ......... | 428/36.91 |
| 2014/0011018 A1 | | 1/2014 | Diehl et al. .............. | C09D 5/08 |
| 2014/0030535 A1 | | 1/2014 | Makotky et al. ............ | 428/480 |
| 2015/0125643 A1 | * | 5/2015 | Takagi ................. | C09D 167/02 |
| | | | | 428/35.8 |
| 2015/0191619 A1 | * | 7/2015 | Hermes ................... | C23C 26/00 |
| | | | | 427/388.4 |
| 2017/0260433 A1 | | 9/2017 | Hennig et al. ......... | C09J 167/06 |
| 2017/0320629 A1 | * | 11/2017 | Han ....................... | B65D 25/14 |
| 2017/0335141 A1 | * | 11/2017 | Hennig .................. | C08L 51/04 |

(Continued)

FOREIGN PATENT DOCUMENTS

| | | | | |
|---|---|---|---|---|
| EP | 1 935 945 | 6/2008 | .............. | C08L 67/04 |
| JP | 5966511 | 7/2016 | .............. | B32B 27/36 |
| WO | WO 2015148685 | 10/2015 | ........... | C09D 167/00 |

(Continued)

OTHER PUBLICATIONS

Degalan® Designed Polymers by Adhesives Resins Product Line, Evonik Industries AG, Mar. 3, 2017, p. 3, https://mychem.ir/uploads/supplier/11965/16c0685319f0bb7.pdf (Year: 2017).*

(Continued)

*Primary Examiner* — Michael C Romanowski
(74) *Attorney, Agent, or Firm* — Hayes Soloway P.C.

(57) ABSTRACT

A film, in particular cover film for food containers, having a base support and a coating arranged at least indirectly on the base support, the base support being produced from a PET-containing material and the coating comprising a first component in the form of a saturated, high molecular, linear copolyester compound A having an average molar mass of at least 10000 g/mol, a second component in the form of a saturated, high molecular, linear, elasticised copolyester compound B having an average molar mass of at least 10000 g/mol, and a third component in the form of a polyolefinic copolymer.

19 Claims, No Drawings

(56) References Cited

U.S. PATENT DOCUMENTS

2019/0284400 A1* 9/2019 Maral ............... B65D 25/34
2020/0239748 A1* 7/2020 Lutz ............... C09J 127/06

FOREIGN PATENT DOCUMENTS

WO   WO-2016125445 A1 *  8/2016  ............ B65D 17/00
WO   WO-2018153539 A1 *  8/2018  ............ B32B 3/26
WO   WO 2018132442       7/2019  ............ B32B 27/18

OTHER PUBLICATIONS

The Technical Data Sheet—Dynapol® L 206, Evonik Industries AG, Mar. 14, 2017, p. 1, https://products.evonik.com/assets/90/92/DYNAPOL_L_206_e_EN_Asset_2269092.pdf (Year: 2017).*

The Technical Data Sheet—Hostaphan® WDW and WDW CSRE 36-65, Mitsubishi Chemical Group, Jun. 2023, p. 1, https://www.m-petfilm.de/wp-content/uploads/WDW-WDW-CSRE-36-65e.pdf (Year: 2023).*

The Technical Data Sheet—Degalan® PM 555, Evonik Industries AG, Jan. 13, 2014, p. 1, https://mychem.ir/uploads/tds/25606.pdf (Year: 2014).*

Adhesives—The Adhesives Magazine of Evonik Industries, Evonik Industries AG, Issue 01, Mar. 27, 2017, pp. 30-33, https://products.evonik.com/assets/49/16/Evonik_adhesives_magezine_2017_EN_244916.pdf (Year: 2017).*

Adhesives!—The Adhesives Journal of Evonik Industries, Evonik Industries AG, Issue 01, Mar. 8, 2019, p. 13, https://products.evonik.com/assets/46/23/The_Adhesives_Journal_2019_01_EN_244623.pdf (Year: 2019).*

German Office Action issued in corresponding German Patent Appln. No. 102019126762.5 (with translation) dated May 19, 2020 (14 pgs).

International Search Report and Written Opinion issued in PCT/EP2020/077759 (with translation) dated Dec. 4, 2020 (23 pgs).

International Preliminary Report on Patentability issued in PCT/EP2020/077759 dated Apr. 5, 2022 (7 pgs).

PET Lidding Degalan VP 4174, Product Information, Evonik Resource Efficiency GmbH, Feb. 2017 (2 pgs).

Adhesion Promotor, Wikipedia, https://de.wikipedia.org/wiki/Haftvermittler, accessed May 18, 2020 (with translation) (8 pgs).

Evonik: "Keep the Pack Stainless!—New Dynapol Polyesters for Interior Can Coating Solutions with Excellent Protective Properties", The Coatings Expert, Issue 1, Apr. 2015 (14 pgs).

Third Party Appeal filed in German Patent Appln. 10 2019 126 762.5, dated Jun. 23, 2022, 78 pages.

Lumitos AG: Therephthalseure. URL: https://www.chemie.de/lexikon/Terephthals%C3%A4ure.html [retrieved Mar. 22, 2024], 2 pages.

Karsten, Erich: Lackrohstoff-Tabellen. 10, Aufl. Hannover: Vincentz, 2000. S. 121—ISBN 3-87870-561-1, 3 pages.

Mitsubushi Polyester Film GmbH: Hostaphan® WDW and WDW CSRE 36-65. Edition May 2021. Weisbaden, 2021. 3S.—Firmenschrift, 3 pages.

SdT-Degalan—Designed Polymers for heat sealing applications, released "Feb. 2019", 5 pages.

Evonik Industries AG: Degalan® Binders for heat seal lacquers. Essen. 5 S.—Firmenschrift, 5 pages.

Evonik Resource Efficiency GmbH: Degalan® and Dynapol® Solutions for flexible packaging applications and printing inks. Feb. 2017/HSP. Marl, 2017. 14 S—Firmenschaft, 14 pages.

Evonik Resource Efficiency GmbH: Dynapol® Polyester resins—Designed polymers for food packaging applications. Feb. 2017/HSP. Marl. 8 S.—Firmenschaft, 8 pages.

Evonik Resource Efficiency GmbH: Dynapol® Product range—Polyester resins. Jan. 2019/HSP. Marl. 17 S.—Firmenschaft, 17 pages.

Evonik Resource Efficiency GmbH: Degalan® VP 4174 E—Technical information. Status: May 2012. Darmstadt, 2012. 2 S.—Firmenschaft, 2 pages.

Evonik Resource Efficiency GmbH: Degalan® Designed polymers by adhesive resins product line. Mar. 2017/e/gh/km. Marl. 5 S.—Firmenschaft, 5 pages.

SdT—D21 Vitel Resins Technical Guide, accessed 2016, 22 pages.

SdT—D22 Produktdatenblatt Vitel1201NSB-P, 2 pages.

Bostik, Inc.: Vittel® 1200B Copolyester extrusion resin. Wauwatosa, 2016. 2 S.—Firmenschrift, 2 pages.

Bostik, Inc.: Vittel® 2200B High molecular weight, linear saturated copolyester resin. Wauwatosa, 2014. 2 S.—Firmenschrift, 2 pages.

Neumann, E. B.: Polymerization reactor design (Auszug). In: Polymer reactor engineering. Dordrecht: Spriner, 1994, S. 131-132. DOI: 10.1007/978-94-011-1338-0. 2 pages.

SdT—D26 Autenrieth, J.S. (1977). Resins for Rubber-Based Adhesives. In I. Skiest (Ed.), Handbook of Adhesives (2. Auflage, Seiten 230-231). Van Nostrand Reinhold Company, 5 pages.

* cited by examiner

FILM, IN PARTICULAR COVER FILM FOR FOOD CONTAINERS AND/OR PHARMACEUTICAL PRODUCTS

BACKGROUND OF THE INVENTION

The present invention relates to a film and, more particularly, to a film which can be used, for example, for covering containers such as food containers. Such films have been known in the prior art for a long time. One type of known film is made of PP (polypropylene) and is also used for covering PP cups, trays and containers.

Typically, such film substrates are formed with heat-sealable lacquers on a PET layer. These usually require a primary layer (such as polyurethane or polyester-based lacquers) and a composition containing bisphenol A resin, polyolefin, styrene copolymer (SBS rubber), alpha-methylstyrene (MS) resins and vinyl chloride copolymers is applied to the heat-sealable layer. This means that the final structure has chlorine, BPA and styrene-formed components. These components are more and more considered critical for food applications and customers would like to avoid them. Because of the SBS/MS components, the grease resistance of the coating layer is also limited. Furthermore, the application of a primer means an additional layer and thus a higher production effort and, concomitantly, more material costs.

SUMMARY OF THE INVENTION

The present invention is therefore based on the object of providing a film or, in particular, a cover film which is simpler to manufacture and which preferably also dispenses with problematic components which are no longer desired by the consumer. Preferably, a film is also to be provided which dispenses with a primary layer or a primer and is sterilisation-resistant.

DETAILED DESCRIPTION OF THE INVENTION

A film, in particular a cover film, for example for food containers or for pharmaceutical products, has a base support and a coating arranged at least indirectly on the base support. Preferably, however, the coating is arranged directly and/or over the entire surface of this base support.

The base support is made of a PET-containing material and the coating has a first component in the form of a saturated, high molecular, linear copolyester compound A with an average molar mass of at least 10000 g/mol and a second component in the form of a saturated, high molecular, linear, elasticised copolyester compound B with an average molar mass of at least 1000 g/mol and a third component in the form of a polyolefinic copolymer.

Generally, the first and or second component is preferably a component having a high molecular weight. A high molecular weight is defined as a molecular weight greater than 10000, preferably greater than 13000, preferably greater than 16000, preferably greater than 20000 g/mol.

In a preferred embodiment, the first component has a hydroxyl value of max. 9 mg KOH/g. Particularly preferably, the first component also has an acid number of max. 3 and a glass transition temperature of at least 65° C.

Particularly preferably, the first component has an average molar mass which is less than 40000 g/mol, preferably less than 30000 g/mol, preferably less than 25000 g/mol.

Preferably, the first component has a density that is between 0.8 and 1.5 g/cm$^3$, preferably between 0.9 and 1.3 g/cm$^3$, and preferably between 1.1 and 1.3 g/cm$^3$. In a particularly preferred embodiment, the first component is Dynapol®L206. Preferably, the first component is a saturated, high molecular, linear copolyester. The first component can, for example, be a component of a lacquer. This has the advantage of being particularly easy to process. In addition or alternatively, it is preferred that the first component is particularly preferably hard, flexible and adhesive to materials and particularly preferably has good chemical resistance. During production, this first component can be present as a solid resin, granulate or solution.

Preferably, the second component or compound B has an acid number of max. 3, a hydroxyl number of max. 5 and a glass transition temperature of at least 10° C.

Preferably, the third component or the polyolefin has a glass transition temperature of at least −55° C. and a molecular weight of at least 160000 g/mol.

In a preferred embodiment, the PET material is selected from a group of materials comprising PET, PET-PET material composites and aluminium-PET composites.

In a further preferred embodiment, the base support has a thickness greater than 6 μm, preferably greater than 10 μm, preferably greater than 20 μm and particularly preferably greater than 30 μm.

In a further preferred embodiment, the base support has a thickness that is less than 100 μm, preferably less than 80 μm, preferably less than 60 μm and particularly preferably less than 55 μm. In a further preferred embodiment, the base support is film-like.

Preferably, the coating is applied flatly over the surface of this base support, and particularly preferably flatly over the entire surface.

Particularly preferably, the carrier is a flat film. One surface of this film can optionally be corona treated.

In a further preferred embodiment, the coating is arranged on the substrate without primer or the film does not have a primer or primer layer. A primer is understood to be a top or intermediate layer that can, for example, serve as a protective layer of an underlying layer or act as an adhesion promoter or improver for the bond between a carrier and a further layer.

Particularly preferably, the coating is formed as only a single layer with a single mixture. However, it would also be possible for several layers to be applied, in particular also of the single mixture. Particularly preferably, the layer thickness has a surface weight which is greater than 1 g/m$^2$, preferably greater than 2 g/m$^2$, preferably greater than 4 g/m$^2$, preferably greater than 5 g/m$^2$, preferably greater than 15 g/m$^2$, preferably greater than 20 g/m$^2$.

In a further preferred embodiment, the coating has a surface weight which is less than 80 g/m$^2$, preferably less than 60 g/m$^2$, preferably less than 50 g/m$^2$, preferably less than 40 g/m$^2$ and preferably less than 30 g/m$^2$.

Particularly preferably, the cover film is used for packaging food, for example dairy products or processed meat. In addition, the cover film can also be used to cover pharmaceutical products. Particularly preferably, the cover film is formed together with a packaging, in particular a packaging made of PP. This packaging can be, for example, bowls or so-called trays.

Preferably, the film can also be used as pouch packaging. For the purposes of the invention, pouch packaging is generally understood to mean a packaging container which consists of film material or is substantially constructed therefrom. For example, sachet, three- and four-edge bags, bags with bottom gusset inserted from two sides, bags with side faces, bags with bottom faces or bag flowpacks with overlapping sealing seam are understood in a non-limiting manner as pouch packaging.

As mentioned above, the carrier or base substrate is a flat film which is optionally corona treated on at least one side. In particular, the side of the carrier on which the coating is arranged is corona treated.

Particularly preferably, the second component is also a saturated, highly molecular, linear, elasticised copolyester compound B.

In a preferred embodiment, the polyolefinic copolymer comprises methacrylic ester olefin and polyester.

In a particularly preferred embodiment, said polyolefin is Degalan®4174E.

Particularly preferably, Degalan®4294E or Degalan®4174E, or mixtures thereof, could also be used as the corresponding polyolefinic component. This is an organic dispersion for use as a chlorine-free binder for heat-seal lacquers. This comprises a direct adhesion to seal untreated PET or aluminium films and in particular polypropylene, polystyrene, PET, PLA or PVC.

In a further preferred embodiment, the coating further comprises, as a further component, a resin. Particularly preferably, this resin is selected from a group of resins and/or comprises a component selected from a group of components comprising reactive resins, benzoguanamine resins, melamine resins, resol resins or combinations thereof.

In a preferred embodiment, the resole resins are BPA (bisphenol A)-free. These resins are particularly preferred to improve the chemical stability and cohesion of the lacquer film.

In a particularly preferred embodiment, the coating is a lacquer layer and/or a lacquer film.

In a further preferred embodiment, the second component has at least one hydroxy group. In this way, better adhesion is achieved.

Particularly preferably, the second component containing the hydroxyl group has a hydroxyl value of at least 4, preferably at least 5, in particular preferably at least 6 (mg KOH/g), based on DIN 53420.

Particularly preferably, the second component comprises a saturated, high molecular, linear and highly elasticised copolyester.

Particularly preferably, the second component is Dynapol® LS 415-34.

In a further preferred embodiment, the coating further comprises a catalyst. For example, phosphoric acid could be used. In addition, silica (silicic acid) or a silicic acid-antiblock composition could be used for the coating.

Preferably, the film comprises silicic acid.

The coating and/or film described here has at least a sealing seam strength of more than 6N per 15 mm, based on DIN 55529, in particular after a heat treatment of 120° C. at about 30 min or a boiling time of 30 min, for example 95° C. water temperature.

The film as mentioned above is preferably sealed over polypropylene trays, containers or cups or used to seal polypropylene trays, containers or cups. This can be done at a temperature of 240° C., a time of 0.5 seconds and/or a pressure of 3 bar. This achieves the same level compared to BPA-based lacquer coatings, wherein, as mentioned above, a primer is particularly preferred to be dispensed with.

The coating described here is sterilisation-resistant, highly grease-resistant and meets the highest standards with regard to olive oil extraction tests for migration studies, which is also an improvement.

Particularly preferably, the coating has the first component in a proportion of more than 1, preferably more than 3, percent by mass. Particularly preferably, the coating comprises the first component in a proportion of less than 20, preferably less than 15, preferably less than 10 and particularly preferably less than 6 mass percent.

This specification and the following specifications are preferably related to a dry film or are mass fraction specifications in a dry film.

Furthermore, the stated proportions are preferably mass proportions and/or percentages based on a total mass. In the following, percentages given in the context of this invention (e.g. XX %) are also to be understood as percentages by mass, unless explicitly stated otherwise.

In a further preferred embodiment, the coating has the second component in a proportion, and in particular a mass proportion, of more than 0.5%, preferably more than 1%. In a further preferred embodiment, the coating comprises the second component in a proportion of less than 7%, preferably less than 6%, preferably less than 5%.

In a further preferred embodiment, the coating comprises the polyolefinic copolymer in a proportion greater than 40%, preferably greater than 50%, preferably greater than 60%, preferably greater than 70% and preferably greater than 75%.

Particularly preferably, the coating comprises the polyolefinic copolymer in a proportion of less than 98%, preferably less than 96%, preferably less than 95% and preferably less than 94%.

In a further preferred embodiment, a non-saturated copolyester may be present as a further component. Particularly preferably, this has a proportion of more than 0.5%, preferably of more than 1%. Preferably, this non-saturated copolyester has a content of less than 5%, preferably less than 4% and preferably less than 3%.

Furthermore, as mentioned above, an anti-blocking agent such as silicic acid may also be present. This is preferably present in a mass proportion of more than 0.1%, particularly preferably more than 1%.

Preferably, this anti-blocking agent, preferably silicic acid, is present in a proportion of less than 5%, preferably less than 4% and preferably less than 3%.

If, as mentioned above, an optional reactive resin, preferably a benzoguanamine resin, is present, this is preferably provided in a proportion of more than 0.1%, preferably more than 1% in the coating. Particularly preferably, this resin is present in a proportion of less than 10%, preferably less than 8%, preferably less than 7% and preferably less than 5%.

If a catalyst, for example phosphoric acid, is present, it is preferably present in a proportion of more than 0.05% and preferably more than 0.1%. Preferably, this catalyst is present in a proportion of less than 1.0%, preferably less than 0.8%, preferably less than 0.7% and preferably less than 0.6%.

The present invention is further directed to a package for food or pharmaceutical products comprising a receptacle for receiving the food or pharmaceutical product and a cover film for covering said receptacle, wherein the cover film is a film of the type described above.

Further, the present invention is directed to a food pouch package for receiving food or pharmaceutical products, wherein the package comprising a film of the type described above.

The preferred embodiments shown below—even if only explicitly stated for one of the packages described above— each concern both a pouch packaging comprising a film of the type described above and a receptacle for receiving the food or pharmaceutical product with a cover film comprising a film of the type described above.

Preferably, the receptacle—if provided—is made of a plastic material and in particular of a material which contains PP and in particular of PP. Preferably, the cover foil is attached to the receptacle and in particular glued or welded on.

Preferably, the film can also be used for sealing bags.

The present invention is further directed to a method for producing a film and, in particular, a cover film for food and/or pharmaceutical products. A base support is first provided, wherein said base support comprising a PET-containing material or consisting of a PET-containing material.

In a further process step, a coating is applied to at least one surface of the base support, wherein the coating comprising a first component in the form of a saturated, high molecular, linear copolyester compound A having a molar mass of at least 10000 g/mol, a second component in the form of a saturated, high molecular, linear, elasticised copolyester compound B having a molar mass of at least 10000 g/mol, and a third component in the form of a polyolefinic copolymer.

The coating or individual components of the coating can be applied as a lacquer. Solvents and solvent mixtures have proven suitable as suitable solvents for the lacquer, in which preferably at least one component is selected from a group comprising butanone (methyl ethyl ketone, MEK), n-propyl acetate, methoxypropyl acetate, ethyl acetate, n-heptane, tert-butyl acetate, and mixtures thereof. Optionally, the lacquer can be adjusted to a suitable processing viscosity before application to the substrate, preferably using a lacquer device, e.g. roller application method. This could be done, for example, by adjusting the solvent content to suit the particular requirements. After application of the lacquer layer, the lacquer film is preferably dried in a hot air channel.

In a preferred process, the surface to which the coating is applied is treated and in particular corona treated. In a further preferred method, the film is sterilised in the sealed state. For example, temperatures in a range from 90 to 135° C. can be used for sterilisation. Furthermore, the film is sterilised over a period of time which is greater than 5 minutes and preferably greater than 10 minutes. Particularly preferably, this period is less than 50 minutes, preferably less than 70 minutes.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

The invention claimed is:

1. A film, in particular a cover film for food containers, said cover film comprising a base support and a coating arranged at least indirectly on the base support, wherein the base support is made of a PET-containing material and the coating has a first component in the form of a saturated, linear copolyester compound A having an average molar mass of at least 10,000 g/mol, a second component in the form of a saturated, linear, elasticised copolyester compound B having an average molar mass of at least 10,000 g/mol, and a third component in the form of a polyolefinic copolymer, wherein the coating comprises the polyolefinic copolymer in a portion greater than 70 percent per mass.

2. The cover film according to claim 1,
wherein
the polyolefinic copolymer comprises methacrylic ester olefin and polyester.

3. The cover film according to claim 1,
wherein
the compound A has a hydroxyl value of at most 9 mg KOH/g measured according to DIN 53240, an acid value of at most 3 mg KOH/g and a glass transition temperature of at least 65° C.

4. The cover film according to claim 1,
wherein
the compound B has an acid number of at most 3 mg KOH/g, a hydroxyl number of at most 5 mg KOH/g measured according to DIN 53240 and a glass transition temperature of at least 10° C.

5. The cover film according to claim 1,
wherein
the polyolefinic copolymer has a glass transition temperature of at least −55° C. and an average molar mass of at least 160,000 g/mol.

6. The cover film according to claim 1;
wherein
the coating contains a resin as a further component.

7. The cover film according to claim 6,
wherein
the resin comprises at least one component selected from the group of components consisting of reactive resins, benzoguanamine resins, melamine resins and resol.

8. The cover film according to claim 1,
wherein
the coating is a lacquer layer and/or a lacquer film.

9. The cover film according to claim 1,
wherein
the coating further comprises a catalyst.

10. The cover film according to claim 1,
wherein
the coating further comprises silicic acid.

11. The cover film according to claim 1,
wherein
the coating is applied flatly over the surface of the base support and the coating surface weight is less than 80 g/m$^2$ and greater than 1 g/m$^2$.

12. The cover film according to claim 1,
wherein
the base support is a flat film, wherein one surface of this film is corona treated.

13. The cover film according to claim 1,
wherein,
the film comprises at least a sealing seam strength of more than 6 N per 15 mm based on DIN 55529.

14. The cover film according to claim 1,
wherein
the coating comprises the first component in a proportion of more than 1 percent by mass and less than 20 percent per mass.

15. The cover film according to claim 1,
wherein
the coating comprises the second component in a proportion of more than 0.5 percent per mass and less than 7 percent per mass.

16. The cover film according to claim 10,
wherein the coating comprises silicic acid in a proportion more than 0.1 percent by mass and less than 5 percent by mass.

17. A package for food or pharmaceutical products comprising a receptacle for receiving said food or pharmaceutical product and a cover film as claimed in claim 1, for covering said receptacle.

18. A food pouch package for containing food or pharmaceutical products, the package comprising a cover film as claimed in claim 1.

19. A method for producing a cover film for food and/or pharmaceutical products, comprising the steps:

providing a base support made of a material containing PET, and applying a coating to at least one surface of the base support, wherein the coating comprises a first component in the form of a saturated, linear copolyester compound A having an average molar mass of at least 10,000 g/mol, a second component in the form of a saturated, linear, elasticised copolyester compound B having an average molar mass of at least 10,000 g/mol, and a third component in the form of a polyolefinic copolymer, wherein the coating comprises the polyolefinic copolymer in a portion greater than 70 percent per mass.

* * * * *